No. 868,128. PATENTED OCT. 15, 1907.
F. W. ROLLER.
ELECTRICAL MEASURING INSTRUMENT.
APPLICATION FILED APR. 25, 1906.
2 SHEETS—SHEET 1.
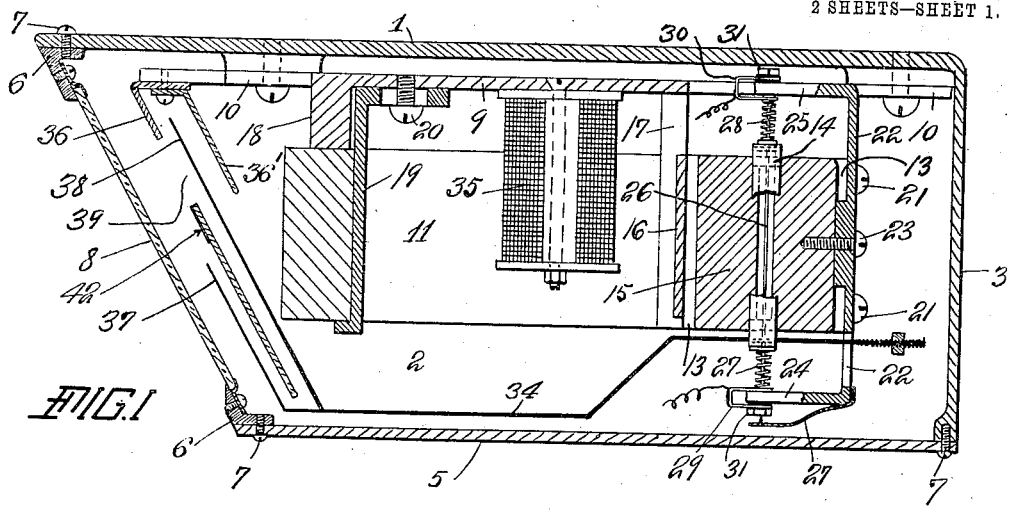
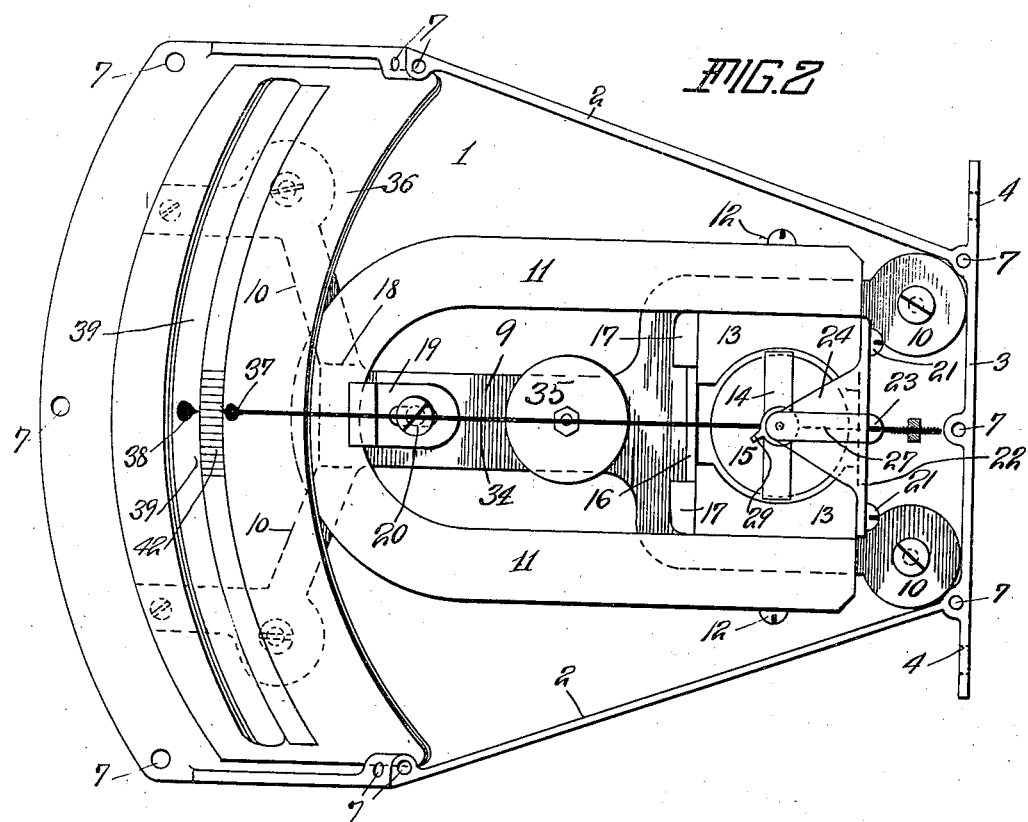
Witnesses
L. A. Sager.
Geo. N. Kerr.
Frank W. Roller, Inventor
By his Attorney
C. W. Edwards No. 868,128. PATENTED OCT. 15, 1907.
F. W. ROLLER.
ELECTRICAL MEASURING INSTRUMENT.
APPLICATION FILED APR. 25, 1906.
2 SHEETS—SHEET 2.
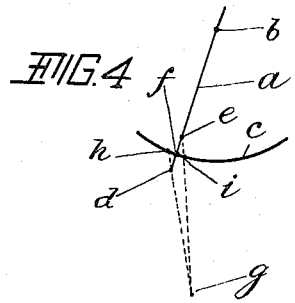
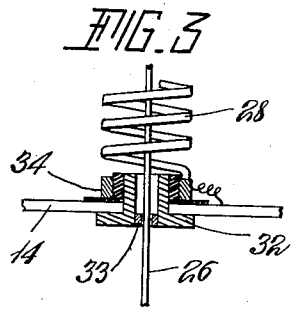
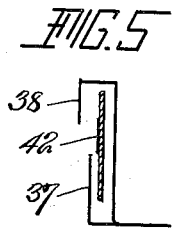
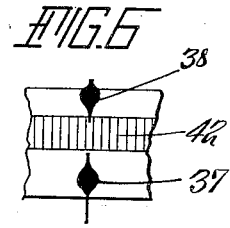
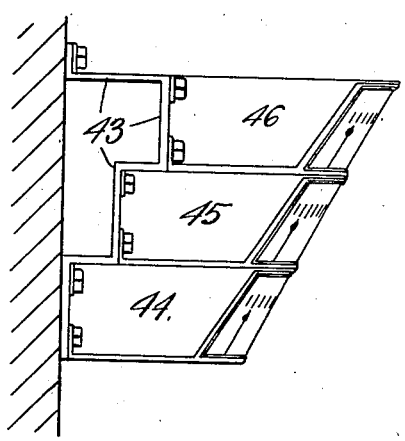
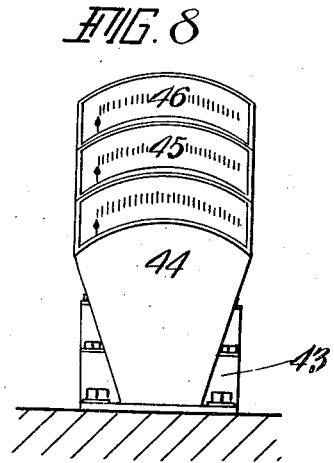
Witnesses
S. R. Sager.
Geo. N. Kerr.
Frank W. Roller, Inventor
By his Attorney
C. V. Edwards

UNITED STATES PATENT OFFICE.

FRANK W. ROLLER, OF NEW YORK, N. Y.

ELECTRICAL MEASURING INSTRUMENT.

No. 868,128.  Specification of Letters Patent.  Patented Oct. 15, 1907.

Application filed April 25, 1906. Serial No. 313,613.

*To all whom it may concern:*

Be it known that I, FRANK W. ROLLER, a citizen of the United States, residing at Plainfield, in the county of Union and State of New Jersey, have invented certain new and useful Improvements in Electrical Measuring Instruments, of which the following is a full, clear, and exact specification.

My invention relates to electrical measuring instruments and involves various features of improvement which overcome many objections to prior forms.

One feature of my invention relates particularly to the general form and arrangement of the instrument with a view to its adaptability to switchboard use. The former forms of instruments for switchboards have been objectionable by reason of the large amount of space required, the difficulty and more frequently the inability of reading the instruments when near the switchboard, at which point it is of most importance for the operator to read the instruments, and the former types have also been objectionable in that the errors which arise when reading different positions are quite appreciable and frequently mislead the operator. These objections are overcome by my invention.

Another feature of my invention relates to the construction by which the working parts are supported and united, all parts preferably being supported from a single base frame.

Another feature of my invention relates to the support and control of the movable element of the instrument. A common form which has been extensively used is one in which a pivoted coil or element is used, the ends of the supporting shaft being pivoted between jewels. In this construction the bearings are tapered so that there is only a very small contact area. The strains to which these parts are subjected in the practical handling and usage of the instrument are enormous due to this small contact area and result in the frequent breaking and damaging of the jewels. It has also been proposed to support the movable element by fibers or fine wires and springs, but if these are made short in length, the strain due to the torsion is excessive and the turning force must be large; if the supporting parts are made long to obviate this difficulty, there is not then sufficient stiffness to overcome the side strain on the parts and the instrument becomes so large as to be cumbersome. In either case the arrangement is objectionable. By my invention the objections to these former types of support are overcome.

Various other advantages are obtained by my invention which may be embodied in various forms of construction and I therefore am not limited in the scope thereof to the particular construction described below and as shown in the accompanying drawings. My invention will however, be understood from the following description and accompanying drawings in which, Figure 1 is a vertical section of one form of instrument embodying my invention; Fig. 2 is a bottom plan view of the same with the lower cover removed; Fig. 3 is a section showing a detail; Fig. 4 is an illustrative diagram; Figs. 5 and 6 are sectional and face views of a modified arrangement of scale; and Figs. 7 and 8 are side and bottom views of a plurality of instruments assembled in a particular manner.

Referring to Figs. 1 and 2, the case of the instrument in this form of my invention consists of three separable parts; one part consisting of a top portion 1 which supports the working parts of the instrument, side portions 2 inclosing the instrument at the sides and inclined at their front edges, and a rear portion 3 having side lugs 4 by which the instrument may be secured to the face of the switchboard or to any other support. The other parts of the casing comprise a bottom portion 5 and a curved inclined front portion 6. These parts of the casing are secured together in any suitable manner, such as by screws at points 7. The curved inclined front portion 6 is practically open except for narrow strips to which a curved glass 8 is secured forming the face of the instrument.

A base frame 9 supports all of the working parts as well as the scale of the instrument and this frame is secured to the part 1 by extensions 10.

The usual permanent magnet is shown at 11. To this are secured by screws 12, the soft iron pole pieces 13, the faces of which are turned to form the cylindrical opening in which the coil 14 moves. Within the coil is fixed the soft iron cylindrical core 15 which aids in producing a strong, uniform magnetic field in which the coil moves. To the inside of the pole pieces 13 is secured a strip 16 of non-magnetic material such as bronze. This strip is notched into two vertical extensions 17 from the frame 9. The magnet 11 also rests against a lug 18 on the frame 9 and an adjustable removable clamp 19 serves to hold the parts firmly together. In making the connection to the base frame, the magnet and parts attached thereto are first placed so that the part 16 engages the recesses in the extensions 17. The clamp 19 is then adjusted to firmly engage the magnet 11 and secured in position by screw 20, which passes through a slot in clamp 19 and enters the frame 9.

To the outer sides of the pole pieces 13 is fixed by screws 21 another non-magnetic frame 22. This has a curved inner part adapted to receive and support the core 15 to which the latter is secured by a screw 23. The frame 22 has two extensions 24, 25 which form the supporting means for the movable element of the instrument. The movable element instead of being pivoted in jewels or supported and guided by springs, is supported, guided and controlled by a construction which has been found to give most satisfactory results. This construction includes a fiber, rod, wire, or thread 26 of any desirable size or material, which is fixed at one end to one extension 25 and passes freely through the frame of coil 14, the core 15 and through the other extension 24 and is fixed at its opposite end to a leaf spring 27 which serves to keep the wire taut and alined. This wire does not support the moving coil, but its function is to guide and center the movable element and prevents any sidewise displacement thereof but does not interfere with the free vertical movement of the coil or with its rotation. The vertical position of the coil is controlled by two spiral springs 27, 28 which encircle the wire 26. One end of each spring is fixed to the movable element and the other end of each spring is fixed to adjustable pieces 29, 30 mounted on the extensions 24, 25. These pieces pivot about the line of wire 26 as an axis, are insulated from the extensions 24, 25 and may be clamped in any angular position desired by the nuts 31. The springs 27, 28 not only serve to vertically position the coil 14 but also tend to hold the coil 14 in a definite angular position corresponding to the zero position of the needle and the deflection of the needle by the electromagnetic action is made against the force of the springs. The electrical connections to the coil 14 are made through the springs 27, 28 from the pieces 29, 30.

The coil 14 is wound upon a frame of low resistance metal such as copper, which when moving in the magnetic field serves to dampen the vibrations. The coil is guided about the wire 26 in jewel bearings and the construction at the upper bearing is shown in Fig. 3. Passing through the frame is a metal bushing 32 in which is seated the perforated jewel 33. The sides of the opening through the jewel are preferably curved as shown, so as to properly center the coil and with the least bearing friction. Insulated from the coil 14 and its frame and from the bushing 32 is a metal ring 34 to which one end of spring 28 is mechanically and electrically connected. One end of coil 14 is also electrically connected to the ring 34. The construction of the lower bearing of the coil is similar to the upper and the bushing 32 or coil frame has secured to it the indicating needle 34.

The instrument is adapted to be used either as an ammeter or as a voltmeter, current passing from one lead through spring 27, coil 14, spring 28 to the other lead of the instrument. When used as a voltmeter, a high resistance 35 will be connected in series with the coil. This resistance is shown as wound on a spool and is conveniently fixed to the main frame 9.

The scale plate 36 is curved and inclined parallel with the glass cover 8 and is also secured to the main frame 9, as shown. The needle 34 carries two pointers, 37, which extends in front of the plate and 38 which is approximately the same distance in back of the plate. In front of the index portion of the pointer 38, the scale plate is open or cut away as at 39 so that this pointer is visible as well as the pointer 37. A plate 36′ is located back of index 38 to give a clear background. It is evident that with the front of the instrument inclined as shown in Fig. 1, the position of the needle may be easily read when the eye is on the level of the instrument or anywhere near this level and what is usually as important, the position of the needle may also be read when the operator is below the instrument as is commonly the case when the operator is close the switchboard.

Another important advantage is the overcoming of erroneous readings of the instrument by the double pointer arrangement described. This will be understood from the diagram of Fig. 4, which of course is somewhat exaggerated. If the line $a$ represents the needle pivoted at $b$, the scale plate may be represented by the line $c$, the outer pointer by point $d$ and the inner pointer by point $e$. If the eye of the operator is in the radial plane of the needle, a correct reading of the scale at $f$ will result. But assume that the eye is at $g$. If the indication of the front pointer is taken, the same position of the needle will give a reading at $h$ instead of $f$ which is evidently quite incorrect. In instruments having a vertical circular scale, and to a certain degree in all instruments the errors in reading from the cause above indicated are quite considerable. But with the pointer back of the scale, this error in reading is avoided. When the eye of the operator at $g$ reads the scale according to the indication of the back pointer, the scale will be read at $i$ which is different from the true reading one way to the same extent that the reading at $h$ is different from the true reading the other way. A reading between the two is therefore correct. Hence when the two pointers give the same reading, the operator is in the radial plane of the needle and the indication is correct and when the two pointers give different readings, the correct indication is that half way between the two which the operator can easily become accustomed to read.

Sometimes it may be desirable to use a needle having two pointers and locate both of them in front of the scale at different distances therefrom. One arrangement of this nature is indicated in Figs. 5 and 6, in which the single scale is indicated at 42 and the two pointers 37, 38 are indicated at different distances in front of the scale. In this case the reading will be correct when the reading of the two pointers is in line. If the eye is to one side however, the reading given by both pointers will be erroneous and will be different from each other. In this case when the readings are different, both will be in error to the same side of the correct reading but of different amounts. The amount of the difference in the reading of the two pointers will however, indicate to the operator that the readings are incorrect and to some extent will indicate to what degree the readings are incorrect.

Another important advantage is secured by my invention which is of particular importance when a plurality of instruments are to be assembled, for example, on a switchboard. Owing to the inclined face of the instrument, as explained with reference to Figs. 1 and 2, the readings may be taken from almost any point without difficulty and is especially easy when near the switchboard. When several instruments are used, I may arrange them so that each one may be read with the same ease and to the same degree of accuracy. Moreover, the space occupied is reduced to the minimum.

Referring to Figs. 7 and 8, three instruments are shown assembled. These are mounted one over the other on a step frame 43 in such a way that the faces of all the instruments form a practically continuous curved inclined surface. The lower instrument 44 is mounted on the frame close to the switchboard. The next instrument 45 is mounted on the first step of the frame 43 and advanced over the instrument 44 by an amount sufficient to bring the faces in practical alinement. Similarly the instrument 46 is advanced over the instrument 45. It will be evident from the side view Fig. 7 and bottom view Fig. 8, that the face of each instrument is clearly visible in any position that the operator may usually be and particularly when he is close to the switchboard. It is also clear from these figures that the surface area on the switchboard which is taken up by this arrangement of instruments is very small. It will of course be understood that instead of supporting the instruments as shown so that they are entirely in front of the switchboard, they may be located mainly within, or back of the switchboard, so that only the front portions extend beyond the face of the switchboard.

Having thus described my invention, I declare that what I claim as new and desire to secure by Letters Patent, is,—

1. In an electrical measuring instrument, the combination with the movable element, of springs tending to hold said element in a definite position axially and from rotation, and a guiding element passing freely through said movable element and about which said movable element may rotate.

2. In an electrical measuring instrument, the combination of a magnet, a movable coil, springs tending to hold said coil in a definite position axially and from rotation, and a thread of suitable material passing freely through said coil and about which said coil may rotate.

3. In an electrical measuring instrument, the combination with the movable element, of springs tending to hold said element in a definite position axially and from rotation, and a thread of suitable material which passes freely through the center of said element and about which said element may rotate.

4. In an electrical measuring instrument, the combination of a magnet, a movable coil subjected to the magnetic field of said magnet and adapted to have a rotatable movement so as to change the direction of the plane of the windings of said coil, means comprising springs tending to hold said coil from rotation and from axial movement, and pivotal means upon which said coil is freely movable axially.

5. In an electrical measuring instrument, the combination of a magnet, a movable coil subjected to the magnetic field of said magnet and adapted to have a rotatable movement so as to change the direction of the plane of the windings of said coil, springs tending to hold said coil from axial movement and from rotation, and pivotal means upon which said coil is freely movable axially.

6. In an electrical measuring instrument, the combination of a magnet, a movable coil subjected to the magnetic field of said magnet and adapted to have a rotatable movement so as to change the direction of the plane of the windings of said coil, springs tending to hold said coil from axial movement and from rotation, and pivotal means upon which said coil may freely rotate and freely move axially.

7. In an electrical measuring instrument, the combination of a magnet, a movable coil subjected to the magnetic field of said magnet, springs tending to hold said coil from axial movement and from rotation, a thread passing freely through said coil and about which said coil may rotate and move axially, and means for maintaining said thread taut.

8. In an electrical measuring instrument, the combination of a magnet, a movable coil subjected to the magnetic field of said magnet and adapted to have a rotatable movement so as to change the direction of the plane of the windings of said coil, resilient means tending to hold said coil from axial movement, and pivotal means upon which said coil is freely movable during rotation and axial movement.

9. In an electrical measuring instrument, the combination of a magnet, a movable coil subjected to the magnetic field of said magnet, and adapted to have a rotatable movement so as to change the direction of the plane of the windings of said coil, resilient means comprising an element which element tends both to hold said coil from axial movement and also from rotation, and centering means about which said coil may freely rotate and move freely axially.

10. In an electrical measuring instrument, a movable element, a plurality of pointers carried by said element, and a scale, the indicating portions of said pointers and the scale each being located at different distances from a point of observation in a plane perpendicular to the scale at the true reading of the instrument.

11. In an electrical measuring instrument, a movable element, indicating means carried by said element, and a scale, said means comprising two pointers one in front and one behind said scale to give too high and too low a reading when read in a plane other than a plane normal to the scale at the true reading of the instrument.

12. In an electrical measuring instrument, a movable element, an indicating needle carried by said element, and a scale, said needle having two pointers one in front and one behind said scale to give too high and too low a reading when read in a plane other than a plane normal to the scale at the true reading of the needle.

13. The combination of a plurality of electrical measuring instruments, each having an inclined scale, and means for supporting said instruments to bring the surfaces of the scales successively forward with reference to another so that said surfaces are substantially an extension one of the other.

14. The combination of a plurality of electrical measuring instruments, each having a scale inclined forwardly from a vertical line, and means for supporting said instruments successively above and with the surfaces of the scales successively forward with reference to another so that said surfaces are substantially an extension one of the other.

15. An electrical measuring instrument comprising a movable element, resilient means comprising an element which element tends both to hold said first named element from axial movement and from rotation, and a thread passing freely through said movable element.

16. An electrical measuring instrument comprising a movable element, resilient means tending to hold said element from axial movement, and a thread passing freely through said movable element.

17. In an electrical measuring instrument, the combination with the movable element, of means tending to hold said element in a definite position axially and from rotation, said means comprising a spring, and a guiding element passing freely through said movable element and about which said movable element may rotate.

18. In an electrical measuring instrument, the combination with the movable element, of resilient means tending to hold said element from rotation and from axial movement, and means passing freely through said element about which said movable element may rotate but which does not prevent axial movement of said element.

In testimony whereof I affix my signature, in presence of two witnesses.

FRANK W. ROLLER.

Witnesses:
L. K. SAGER,
GEO. A. HOFFMAN.